US009000100B2

(12) United States Patent
Hailu et al.

(10) Patent No.: US 9,000,100 B2
(45) Date of Patent: Apr. 7, 2015

(54) SOLVENT COMPOSITIONS

(75) Inventors: Alefesh Hailu, Cincinnati, OH (US); Timothy H. Anderson, Hamilton, OH (US)

(73) Assignee: Cognis IP Management GmbH, Duesseldorf (DE)

( * ) Notice: Subject to any disclaimer, the term of this patent is extended or adjusted under 35 U.S.C. 154(b) by 88 days.

(21) Appl. No.: 13/642,631

(22) PCT Filed: Mar. 5, 2011

(86) PCT No.: PCT/EP2011/001096

§ 371 (c)(1),
(2), (4) Date: Oct. 22, 2012

(87) PCT Pub. No.: WO2011/131272

PCT Pub. Date: Oct. 27, 2011

(65) Prior Publication Data

US 2013/0037749 A1 Feb. 14, 2013

(30) Foreign Application Priority Data

Apr. 22, 2010 (EP) .................................... 10004307

(51) Int. Cl.

| | |
|---|---|
| ***C08G 65/32*** | (2006.01) |
| ***C11D 1/835*** | (2006.01) |
| ***C11D 1/00*** | (2006.01) |
| ***C11D 1/52*** | (2006.01) |
| ***C11D 3/20*** | (2006.01) |
| ***C11D 3/37*** | (2006.01) |
| ***C11D 7/26*** | (2006.01) |
| ***C11D 7/50*** | (2006.01) |
| ***C11D 9/22*** | (2006.01) |
| ***C11D 9/30*** | (2006.01) |
| ***C11D 10/04*** | (2006.01) |

(52) U.S. Cl.
CPC ................ *C11D 1/835* (2013.01); *C11D 1/008* (2013.01); *C11D 1/521* (2013.01); *C11D 3/2079* (2013.01); *C11D 3/3707* (2013.01); *C11D 7/265* (2013.01); *C11D 7/5013* (2013.01); *C11D 9/225* (2013.01); *C11D 9/30* (2013.01); *C11D 10/045* (2013.01); *C11D 10/047* (2013.01)

(58) Field of Classification Search
CPC ...... C11D 7/263; C11D 7/265; C11D 7/3263; C11D 7/5004; C11D 7/5013; C11D 7/5022; C11D 1/04; C11D 1/72; C11D 1/721; C11D 1/83; C11D 10/042; C11D 10/045; C11D 2003/32
USPC .................. 252/364; 524/186, 270, 284, 394; 525/403, 408
See application file for complete search history.

(56) References Cited

U.S. PATENT DOCUMENTS

| | | | | |
|---|---|---|---|---|
| 5,700,771 | A | 12/1997 | Hardy et al. | |
| 6,380,410 | B1 | 4/2002 | Oftring et al. | |
| 2001/0014654 | A1 | 8/2001 | Davister et al. | |
| 2002/0006889 | A1* | 1/2002 | Wurtz et al. | 510/421 |
| 2005/0064004 | A1* | 3/2005 | Schnabel et al. | 424/405 |

OTHER PUBLICATIONS

Cahn, A.; 5$^{th}$ World Conference on Detergents, 2003, p. 182.*
Tadros, T.F.; Applied Surfactants: Principles and Applications, 2005, p. XIX-17.*
Myers, D.; Surfactant Science and Technology, 2006, p. 64.*
"International Search Report in PCT/EP2011/001096", Jun. 28, 2011, 2 pgs.

* cited by examiner

*Primary Examiner* — Robert Jones, Jr.
(74) *Attorney, Agent, or Firm* — Servilla Whitney LLC

(57) ABSTRACT

Suggested are solvent compositions, comprising (a) Carboxylic acid dialkyl amides (b) Fatty acids or their salts, and (c) Ethylene oxide-propylene oxide copolymers.

10 Claims, No Drawings

SOLVENT COMPOSITIONS

CROSS-REFERENCE TO RELATED APPLICATIONS

This application is the National Stage entry of PCT/EP2011/001096, filed on Mar. 5, 2011, which claims priority to European Patent application number 10004307, filed on Apr. 22, 2010, both of which are incorporated herein by reference in their entireties.

TECHNICAL FIELD

The present invention is related to the area of environmentally friendly, so-called green solvents, and relates to solvent compositions comprising carboxylic acid amides with improved solubility in hard water.

BACKGROUND

During the recent years the need for environmentally friendly, so-called "green" solvents has dramatically increased. In particular solvents like toluene, cumene, NMP and the like, which were used for decades in numerous technical areas, are waiting to be replaced by alternatives exhibiting at least comparable properties, while being less toxic and showing an improved bio-degradability. Among these solvents carboxylic acid amides especially species obtained from fatty acids of renewable origin have become very popular both for their solubilization power and their advantageous eco-toxicological behaviour. In particular, fatty acid amides are used as solvents in agriculture, for degreasing of metal surfaces, process aids and the like.

A major disadvantage of this group of solvents, however, is associated with their poor solubility in tap water showing a water hardness of up to 500 ppm calcium and/or magnesium ions. While said amides are pretty well water-soluble in the absence of alkaline earth metal ions, solubility decreases significantly in case the water turns to become "hard". One or more embodiments of the present invention thus improve hard-water solubility of carboxylic acid amides by adding certain emulsifiers or dispersants, without decreasing the solubilizing power of said amides.

SUMMARY

One aspect of the invention relates to a solvent composition comprising (a) carboxylic acid amides (b) fatty acids or their salts, and (c) ethylene oxide-propylene oxide copolymers. Another aspect of the invention relates to a method of dissolving a solute comprising using a solvent composition comprising (a) carboxylic acid amides (b) fatty acids or their salts, and (c) ethylene oxide-propylene oxide copolymers. Another aspect of the invention relates to a method for improving the solubility or dispersability of carboxylic acid amides in water comprising up to 500 ppm alkaline earth metal cations comprising using a blend comprising fatty acids or their salts and ethylene oxide-propylene oxide copolymers as emulsifiers.

DETAILED DESCRIPTION

The present invention refers to solvent composition, comprising (a) Carboxylic acid amides (b) Fatty acids or their salts, and (c) Ethylene oxide-propylene oxide copolymers.

Surprisingly, it has been observed that already small amounts of blends comprising fatty acids or fatty acid soaps and non-ionic polymers of the polyethylene glycol-poly propylene glycol type, optionally end capped by alkyl or alkyl phenol groups show the ability to improve solubility of carboxylic acid amides in hard water, showing a concentration of calcium and magnesium ions of up to 500 ppm, significantly. Compounds, comprising said amides, fatty acids and polymers have been found very useful as environmentally-friendly, green solvents for various purposes, for example for the preparation of agrochemicals, degreasing agents, process fluids and the like. In particular, the compounds according to the present invention allow preparing also aqueous concentrates, for examples aqueous biocide concentrates, based on tap water of high water hardness.

Carboxylic Acid Amides

Carboxylic acid amides representing component a of the compositions according to the present invention typically follow general formula (I)

$$R^1CO—NR^2R^3 \qquad (I)$$

in which $R^1CO$ stands for an optionally hydroxy-substituted, saturated or unsaturated, linear or branched acyl radical having 6 to 22, preferably 8 to 12 carbon atoms, $R^2$ represents hydrogen or an alkyl group having 1 to 12 carbon atoms and $R^3$ stands for an alkyl group having 1 to 12 carbon atoms. In a first preferred embodiment the present invention refers to carboxylic acid dialkyl amides, and more particular to dimethyl amides, dibutyl amides, dioctyl amides, or di-2-ethylhexyl amides. Rather useful have been found dialkyl amides selected from the following group—taken alone or in combination: capric acid dimethyl amide, capric acid dibutyl amide, capric acid dioctyl amide, capric acid di-2-ethylhexyl amide, caprylic acid dimethyl amide, caprylic acid dibutyl amide, caprylic acid Dioctyl amide, caprylic acid di-2-ethylhexyl amide, capronic acid dimethyl amide, capronic acid dibutyl amide, capronic acid di-2-ethylhexyl amide, lauric acid dimethyl amide, lauric acid dibutyl amide, lauric acid di-2-ethylhexyl amide, lactic acid dimethyl amide, lactic acid dibutylamide, lactic acid di-2-ethylhexyl amide and their blends.

Fatty Acids and Their Salts

Fatty acids or their salts (component b) represent the main emulsifier which is added to the carboxylic acid amides in order to improve their hard water solubility. Typically, the compounds follow general formula (II), $$R^4CO—OX \qquad (II)$$

in which $R^4CO$ stands for a saturated or unsaturated, linear or branched acyl radical having 6 to 36, preferably 12 to 22 carbon atoms and X represents hydrogen, an alkaline metal, an alkaline earth metal, ammonium or alkyl ammonium. Typical examples are fatty acids selected from the group consisting of lauric acid, myristic acid, palmitic acid, stearic acid, oleic acid, linolic acid, linoleic acid, behenic acid, erucic acid or their technical blends, as for example one can obtain from natural triglycerides like coco oil, palm oil, palm kernel oil, olive oil, saflor oil, sunflower oil and the like. In another preferred embodiment the fatty acids are derived from tall oil ("tall oil fatty acid") showing on average 12 to 18 carbon atoms and an iodine number above 20.

Ethylene Oxide-Propylene Oxide Polymers

Ethylene oxide-propylene oxide copolymers (component c) represent the co-emulsifying component in the composition. Typically, the polymers follow general formula (III)

$$R^5O(EO)_x(PO)_yR^6 \qquad (III)$$

in which $R^5$ and $R^6$ independently from each other for hydrogen, an alkyl or alkenyl group having 1 to 18 carbon atoms, or an alkyl phenol group having 1 to 18 carbon atoms in the alkyl part, EO stands for an ethylene oxide unit, PO stands for a propylene oxide unit, x and y independently stand for integers of about 10 to about 100, preferably about 20 to about 80 and more preferably about 30 to about 50 and the sum (x+y) stands for integers of about 50 to about 150 on condition that the EO and PO units show either a blockwise or a randomized distribution over the molecule. In another preferred embodiment of the present invention said ethylene oxide-propylene oxide copolymers follow general formula (III) in which $R^5$ stands for nonyl phenol, $R^6$ for hydrogen, and x and y for integers of from about 25 to about 50. Most preferred is a compound representing an adduct of about 40 ethylene oxide and about 30 propylene oxide units to nonyl phenol.

Solvent Compositions

Typically, a solvent composition according to the present invention encompasses (a) about 90 to about 95% b.w. carboxylic acid dialkyl amides, (b) about 2 to about 4% b.w. fatty acids or their salts, and (c) about 1 to about 3% b.w. ethylene oxide-propylene oxide copolymers, on condition that the amounts add to 100% b.w.

INDUSTRIAL APPLICATION

As explained above, the compositions according to the present invention exhibit strong solvent power combined with high biodegradability, excellent environmental friendliness and in particular high tolerance of alkaline earth metals when brought into an aqueous medium. Therefore, another aspect of the present invention refers to the use of a composition comprising (a) Carboxylic acid amides (b) Fatty acids or their salts, and (c) Ethylene oxide-propylene oxide copolymers, as solvents, in particular for agricultural compositions (e.g. aqueous biocide concentrates), degreasing agents, process fluids and the like. The present invention also encompasses a method for improving the solubility of carboxylic acid amides in water comprising up to 500 ppm alkaline earth metal cations by adding 1 to 5% b.w.—calculated on the amides—of an emulsifier blend comprising fatty acids or their salts and ethylene oxide-propylene oxide copolymers. Preferably, said emulsifier blends comprise fatty acids or their salts on one hand and ethylene oxide-propylene oxide copolymers on the other in weight ratios of about 50:50 to about 95:5, in particular about 60:40 to about 90:10 and more particular about 70:30 to about 80:20.

A final embodiment of the present invention refers to the use of a blend comprising fatty acids or their salts and ethylene oxide-propylene oxide copolymers as emulsifiers for improving the solubility or dispersability of carboxylic acid amides in water comprising up to 500 ppm alkaline earth metal cations, said blends comprising the fatty acids or their salts and the ethylene oxide-propylene oxide copolymers typically in weight ratios of about 50:50 to about 95:5, in particular about 60:40 to about 90:10 and more particular about 70:30 to about 80:20.

EXAMPLES

Example 1

Comparative Examples C1 to C5

Solvent compositions based on caprylic acid dimethyl amide, emulsifiers and co-emulsifiers were prepared and diluted (5% b.w.) in water comprising 500 ppm calcium and magnesium ions (50:50). The emulsions were stored for one day at 20° C. and stability determined after 5, 10 and 24 hours. The results are compiled in the following table 1 and have the following meaning: (+++)=clear emulsion, (++)=slightly turbid, (+)=turbid, (–)=separated.

TABLE 1

Emulsion stability of Caprylic acid dimethyl amide/surfactant concentrates

| | 1 | C1 | C2 | C3 | C4 | C5 |
|---|---|---|---|---|---|---|
| **Compound** | | | | | | |
| Caprylic acid dimethyl amide | 85 | 85 | 85 | 85 | 85 | 85 |
| Tall oil fatty acid | 12 | 15 | – | – | – | – |
| Sodium dodecyl benzene sulfonate | – | – | 12 | – | – | – |
| Sodium Laureth-2 Sulfate | – | – | – | 12 | – | – |
| Laurylalcohol + 2EO | | – | – | – | 12 | – |
| Tallow fatty amine + 20EO | – | – | | – | | 12 |
| Nonylphenol + 40EO + 30PO | 3 | – | 3 | 3 | 3 | 3 |
| **Emulsion stability** | | | | | | |
| after 5 h | +++ | +++ | ++ | ++ | + | + |
| after 10 h | +++ | ++ | + | + | + | + |
| after 24 h | +++ | + | – | – | – | – |

The examples and comparative examples clearly indicate that only adding a blend of a fatty acid and an EO/PO-Copolymer leads to a clear and stable emulsion.

Example 2

Comparative Examples C6 to C10

Solvent compositions based on lactic acid dimethyl amide, emulsifiers and co-emulsifiers were prepared and diluted (5% b.w.) in water comprising 200 ppm calcium and magnesium ions (50:50). The emulsions were stored for one day at 20° C. and stability determined after 5, 10 and 24 hours. The results are compiled in the following table 2 and have the following meaning: (+++)=clear emulsion, (++)=slightly turbid, (+)=turbid, (–)=separated.

TABLE 2

Emulsion stability of Lactic acid dimethyl amide/surfactant concentrates

| | 2 | C6 | C7 | C8 | C9 | C10 |
|---|---|---|---|---|---|---|
| **Compound** | | | | | | |
| Lactic acid dimethyl amide | 85 | 85 | 85 | 85 | 85 | 85 |
| Palm oil fatty acid | 12 | – | – | – | – | – |
| Glycerol | – | – | 15 | – | – | – |
| Tristyryl phenol | – | – | – | 15 | – | – |
| Soy oil + 40 EO | | – | – | – | 1 | – |
| Sorbitanmonostearate | – | – | – | – | – | 15 |
| Nonylphenol + 30EO + 40PO | 3 | 15 | – | – | | – |
| **Emulsion stability** | | | | | | |
| after 5 h | +++ | – | + | + | + | + |
| after 10 h | +++ | – | – | – | + | + |
| after 24 h | +++ | – | – | – | – | – |

The examples and comparative examples clearly indicate that only adding a blend of a fatty acid and an EO/PO-Copolymer leads to a clear and stable emulsion.

The invention claimed is:

1. A solvent composition, comprising (a) about 90 to 95% b.w. of carboxylic acid amides selected from the group consisting of dimethyl amides, dibutyl amides, dioctyl amides, and di-2-ethylhexyl amides, (b) about 2 to 4% b.w. of fatty acids or their salts, and (c) about 1 to 3% b.w. of ethylene oxide-propylene oxide copolymers on condition that the amounts add to 100% b.w.

2. The solvent composition according to claim 1, wherein said carboxylic acid amides are selected from the group consisting of capric acid dimethyl amide, capric acid dibutyl amide, capric acid dioctyl amide, capric acid di-2ethylhexyl amide, caprylic acid dimethyl amide, caprylic acid dibutyl amide, caprylic acid dioctyl amide, caprylic acid di-2-ethylhexyl amide, capronic acid dimethyl amide, capronic acid dibutyl amide, capronic acid dioctyl amide, capronic acid di-2-ethylhexyl amide, lauric acid dimethyl amide, lauric acid dibutyl amide, lauric acid di-2-ethylhexyl amide, lactic acid dimethyl amide, lactic acid dibutylamide, lactic acid di-2-ethylhexyl amide and their blends.

3. The solvent composition according to claim 1, wherein said fatty acids or their salts (component b) follow general formula (II), $$R^4CO—OX \quad (II)$$

in which $R^4CO$ stands for a saturated or unsaturated, linear or branched acyl radical having 6 to 36 carbon atoms and X represents hydrogen, an alkaline metal, an alkaline earth metal, ammonium or alkyl ammonium.

4. The solvent composition according to claim 3, wherein said fatty acids (component b) are selected from the group consisting of lauric acid, myristic acid, palmitic acid, stearic acid, oleic acid, linolic acid, linoleic acid, behenic acid, erucic acid or their technical blends.

5. The solvent composition according to claim 1, wherein said fatty acids (component b) represent tall oil fatty acid.

6. The solvent composition according to claim 1, wherein said ethylene oxide-propylene oxide copolymers follow general formula (III)

$$R^5O(EO)_x(PO)_yR^6 \quad (III)$$

in which $R^5$ and $R^6$ independently from each other for hydrogen, an alkyl or alkenyl group having 1 to 18 carbon atoms, or an alkyl phenol group having 1 to 18 carbon atoms in the alkyl part, EO stands for an ethylene oxide unit, PO stands for a propylene oxide unit, x and y independently stand for integers of 10 to 100 and the sum (x+y) stands for integers of 50 to 150 on condition that the EO and PO units show either a blockwise or a randomized distribution over the molecule.

7. The solvent composition according to claim 6, wherein said ethylene oxide-propylene oxide copolymers follow general formula (III) in which $R^5$ stands for nonyl phenol, $R^6$ for hydrogen, and x and y for integers of from 25 to 50.

8. The solvent composition according to claim 1, wherein the solvent composition comprises (a) about 90 to 95% b.w. of component (a), (b) about 2 to 4% b.w. of component (b), and (c) about 1 to 3% b.w. of component (c), on condition that the amounts add to 100% b.w.

9. A method of dissolving a solute, the method comprising contacting a solute with the solvent composition of claim 1.

10. The solvent composition according to claim 7, wherein x is an integer of about 40 and y is an integer of about 30.

* * * * *